Patented Sept. 15, 1953

2,652,418

UNITED STATES PATENT OFFICE 2,652,418

ACIDIC ESTERS OF OXYALKYLATED TETRA-METHYLOLCYCLOHEXANOL

Melvin De Groote, University City, Mo., assignor to Petrolite Corporation, a corporation of Delaware No Drawing. Continuation of applications Serial No. 104,801 and Serial No. 104,802, July 14, 1949. This application December 29, 1950, Serial No. 203,534

9 Claims. (Cl. 260—475)

The present invention is a continuation of my co-pending applications Serial Nos. 104,801, now Patent No. 2,552,528, and 104,802, now abandoned, both filed July 14, 1949.

More specifically, the present invention is concerned with certain acidic esters hereinafter described in detail. Such esters are of value for various purposes, and particularly for the resolution of petroleum emulsions of the water-in-oil type. This specific invention is described in my co-pending application Serial No. 203,533, filed December 29, 1950.

The acidic esters which constitute my invention and which are hereinafter described in detail are not only useful for breaking oil field emulsions, but can be used for other purposes, such as serving as intermediates for further reaction, or for use as break-inducers in the doctor treatment of sour hydrocarbons, or as components of emulsions, wherein they serve as an emulsifier aid or adjunct, or as a common solvent. The acidic esters may be neutralized in various fashions with compounds varying from triethanolamine to cyclohexylamine, thus yielding derivatives in which the oil-in-water solubility varies considerably from the original acidic esters themselves. These ester salts so obtained are valuable for the various purposes previously mentioned, such as breaking of petroleum emulsions of the water-in-oil type, emulsion stabilizers, for use as break-inducers in the doctor treatment of sour hydrocarbons, etc.

In my co-pending applications Serial Nos. 104,801 and 104,802, both filed July 14, 1949, I have described, among other things, high molal oxypropylation derivatives of:

(A) High molal oxypropylation derivatives of monomeric polyhydric compounds with the proviso that—

(a) The initial polyhydric reactant be free from any radical having at least 8 uninterrupted carbon atoms;

(b) The initial polyhydric reactant have a molecular weight not over 1200 and at least 4 hydroxyl radicals;

(c) The initial polyhydric reactant be water-soluble and xylene-insoluble;

(d) The oxypropylation end product be water-insoluble and xylene-soluble;

(e) The oxypropylation end product be within the molecular weight range of 2000 to 30,000 on an average statistical basis;

(f) The solubility characteristics of the oxypropylation end product in respect to water and xylene be substantially the result of the oxypropylation step;

(g) The ratio of propylene oxide per hydroxyl in the initial polyhydric reactant be within the range of 7 to 70;

(h) The initial polyhydric reactant represent not more than 12½%, by weight, of the oxypropylation end product on a statistical basis;

(i) The preceding provisos being based on complete reaction involving the propylene oxide and the initial polyhydric reactant; and (B) Polycarboxy reactants, and with the further proviso that the ratio of polycarboxy reactant to hydroxylated reactant be in the molar proportion of one mole of polycarboxy reactant for each hydroxyl present in the alcoholic reactant.

The co-pending application above referred to, i. e., Serial No. 104,802, filed July 14, 1949, is concerned with the new derivatives as such without limitation as to any particular use.

The aforementioned co-pending applications included at least one compound, which, although not strictly within the limits defined, still possessed the same distinctive and valuable properties, i. e., oxypropylation derivative of 2-2-6-6-tetramethylolcyclohexanol. This product is made by General Mills, Inc., Minneapolis, Minnesota. For convenience and brevity, it is referred to in the trade, and is described by the manufacturer, as "TMC." Hereafter, reference will either be made to TMC or tetramethylolcyclohexanol.

The present invention is concerned with a fractional ester obtained from a polycarboxy acid and a pentalol, i. e., a chemical compound having 5 alkanol hydroxyls or the equivalent comparable to diols, triols, and tetralols. The particular hydroxylated compound herein employed is obtained by the oxypropylation of TMC or the simple ethers of TMC (tetramethylolcyclohexanol) by treating said compound with 1 to 10 moles of ethylene oxide or butylene oxide, or a mixture thereof. All such derivatives are characterized by having 5 terminal hydroxyl radicals.

TMC is depicted thus:

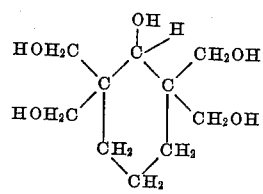

If, for convenience, the above compound be indicated in the following manner: R'(OH)5, then the oxypropylation derivatives can be indicated thus:

$$R'[O(RO)_nH]_5$$

wherein $n$ is a number almost invariably more than one and may be as much as 25 or 30 or more with 10 to 20 as being a representative value. As will be pointed out hereinafter, when the molecular weight of such oxypropylation derivatives on the average reach 3,000 or more, based on the hydroxyl value, the product is at least emulsifiable in kerosene, and frequently, and often not infrequently, perfectly soluble in kerosene. This is the preferred type of material, and particularly with the further proviso that the molecular weight, based on the hydroxyl value, be between 3,000 and 5,000.

As has been pointed out previously, in a generic sense, the invention involves the ethers obtained by use of ethylene oxide, butylene oxide, etc., as well as TMC itself.

If one indicates a polycarboxy acid in the following manner:

$$R''\begin{matrix}COOH\\(COOH)_{n'}\end{matrix}$$

in which R'' is the radical of a polycarboxy acid, as indicated, and which is preferably free from any radicals having more than 8 uninterrupted carbon atoms in a single group, and $n'$ is a whole number not greater than 2.

If one mole of the oxypropylated derivative previously described by the formula:

$$R'\Big[O(RO)_nH\Big]_5$$

is esterified with a polycarboxy acid, as previously described, in the ratio of 5 moles of the polycarboxy acid or equivalent for each mole of oxypropylated TMC, then the acidic fractional ester so obtained can be indicated by the following formula:

$$R'\Big[O(RO)_n\overset{O}{\overset{\|}{C}}R''(COOH)_{n'}\Big]_5$$

in which the various characters have their previous significance.

Such compound, of course, does not define the invention in its most generic aspect, for the obvious reason that it has not included the ethers of TMC previously described. Furthermore, to a rather small extent an inner ester might be formed, or there may occur some other resultants appearing from some other side reaction.

Summarizing the present invention, then, it is concerned with the acidic fractional ester obtained by reaction between (A) the polycarboxy acid, and (B) hydrophile synthetic products obtained by the oxypropylation of tetramethylolcyclohexanol and the pentahydroxylated ethers thereof obtained by reacting tetramethylolcyclohexanol with an alkylene oxide selected from the class of ethylene oxide and butylene oxide in the ratio of 1 to 10 moles of the oxide for each mole of tetramethylolcyclohexanol, with the proviso that the oxypropylated compound, prior to esterification, have a molecular weight within the range of 1,500 and 6,000. Preferably, the pentahydroxylated compound should be at least emulsifiable in kerosene. The oxypropylated TMC or TMC compound may be used, even though it is kerosene-insoluble, i. e., even though its molecular weight is in the low range, for instance, in the neighborhood of 1,500 to 1,750.

Furthermore, it is preferred that the polycarboxy acid have not over 8 carbon atoms. The acidic fractional esters above described are obtained by reacting 5 moles of the polycarboxy reactant with one mole of the pentahydroxylated reactant.

For convenience, what is said hereinafter will be divided into three parts:

Part 1 is concerned with the oxypropylation of tetramethylolcyclohexanol. The same procedure, of course, would be applicable to the hydroxylated ethers above described. In fact, the ethers can be prepared in the same manner from tetramethylolcyclohexanol by use of ethylene oxide or butylene oxide, or a mixture;

Part 2 is concerned with the preparation of the acidic fractional esters from the aforementioned pentalols, i. e., the pentahydroxylated compounds obtained as described in Part 1; and Part 3 is concerned with other derivatives valuable for various purposes including demulsification but not specifically claimed in the instant application.

PART 1

For a number of well known reasons equipment, whether laboratory size, semi-pilot plant size, pilot plant size, or large scale size, is not, as a rule, designed for a particular alkylene oxide. Invariably, and inevitably, however, or particularly in the case of laboratory equipment and pilot plant size, the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as, for example, 95° to 120° C. Under such circumstances, the pressure will be less than 30 pounds per square inch, unless some special procedure is employed, as is sometimes the case, to wit, keeping an atmosphere of inert gas such as nitrogen in the vessel during the reaction. Such low-temperature low-reaction rate oxypropylations have been described very completely in U. S. Patent No. 2,448,664, to H. R. Fife et al., dated September 7, 1948. Low-temperature low-pressure oxypropylations are particularly desirable where the compound being subjected to oxypropylation contains one, two, or three points of reaction only, such as monohydric alcohols, glycols and triols.

Since low-pressure low-temperature reaction speed oxypropylations require considerable time, for instance, 1 to 7 days of 24 hours each to complete the reaction, they are conducted, as a rule, whether on a laboratory scale, pilot plant scale, or large scale, so as to operate automatically. The prior figure of seven days applies especially to large-scale operations. I have used conventional equipment with two added automatic features:

(a) A solenoid-controlled valve which shuts off the propylene oxide in event that the temperature gets outside a predetermined and set range, for instance, 95° to 120° C.; and (b) Another solenoid valve which shuts off the propylene oxide (or for that matter ethylene oxide if it is being used) if the pressure gets beyond a predetermined range, such as 25 to 35 pounds.

Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation, whether it be oxypropylation or oxyethylation. With certain obvious changes, the equipment can be used also to permit oxyalkylation involving the use of glycide where no pressure is involved, except the vapor pressure of a solvent, if any, which may have been used as a diluent.

As previously pointed out, the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds' gauge pressure. This pressure obviously is far beyond any requirement as far as propylene oxide goes, unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water and further equipped with electrical heating devices. Such autoclaves are, of course, in essence, small-scale replicas of the usual conventional autoclave used in oxyalkylation procedures. In some instances, in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances, a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass, protective screens, etc.

Attention is directed again to what has been said previously in regard to automatic controls, which shut off the propylene oxide in event temperature of reaction passes out of the predetermined range, or if pressure in the autoclave passes out of predetermined range.

With this particular arrangement practically all oxypropylations become uniform, in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances, the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide, if fed continuously, would be added at a rate so that the predetermined amount would react within the first 15 hours of the 24-hour period or two-thirds of any shorter period. This meant that if the reaction was interrupted automatically for a period of time for pressure to drop or temperature to drop, the predetermined amount of oxide would still be added, in most instances, well within the predetermined time period. Sometimes where the addition was a comparatively small amount in a 10-hour period, there would be an unquestionable speeding up of the reaction, by simply repeating the examples and using 3, 4, or 5 hours instead of 10 hours.

When operating at a comparatively high temperature, for instance, between 150° to 200° C., an unreacted alkylene oxide such as propylene oxide, makes its presence felt in the increase in pressure, or the consistency of a higher pressure.

However, at a low enough temperature it may happen that the propylene oxide goes in as a liquid. If so, and if it remains unreacted, there is, of course, an inherent danger and appropriate steps must be taken to safe-guard against this possibility; if need be, a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight, the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature, even in large scale operations, as much as a week or ten days' time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction, the scale movement through a time operating device was set for etither one to two hours, so that reaction continued for 1 to 3 hours after the final addition of the last propylene oxide, and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point, as previously set out. All the points of design, construction, etc., were conventional, including the gases, check valves and entire equipment. As far as I am aware, at least two firms, and possibly three, specialize in autoclave equipment such as I have employed in the laboratory, and are prepared to furnish equipment of this same kind. Similarly, pilot plant equipment is available. This point is simply made a precaution in the direction of safety. Oxyalkylations, particularly involving ethylene oxide, glycide, propylene oxide, etc., should not be conducted except in equipment specifically designed for the purpose.

*Example 1a*

The starting material was a commercial grade of tetramethylolcyclohexanol. The particular autoclave employed was one with a capacity of 15 gallons, or on the average of 120 pounds of reaction mass. The speed of the stirrer could be varied from 150 to 350 R. P. M. Approximately 8.6 pounds of tetramethylolcyclohexanol were charged into the autoclave along with .82 pound of caustic soda. The reaction pot was flushed out with nitrogen. The autoclave was sealed and the automatic devices adjusted for injecting 58.2 pounds of propylene oxide in approximately 10 hours. The pressure was set for a maximum of 35 pounds per square inch. This meant that the bulk of the reaction could take place, and probably did take place, at a lower pressure. The comparatively low pressure was the result of the fact that considerable catalyst was present and also the reaction time was fairly long. The propylene oxide was added comparatively slowly, and more important, the selected temperature range was 205° to 215° F. (approximately the boiling point of water). The initial introduction of propylene oxide was not started until the heating devices had raised the temperature to about the boiling point of water. At the completion of the reaction a sample was taken and oxypropylation proceeded as described in Example 2a, following.

*Example 2a*

Approximately 59.7 pounds of reaction mass identified as Example 1a, preceding, were permitted to remain in the reaction vessel, and, without the addition of any more catalyst, 43.02 pounds of propylene oxide were added. The oxypropylation was conducted in substantially the same manner with regard to pressure and temperature, as in Example 1a, preceding, except that the reaction was complete in somewhat less time, i. e., 8 hours instead of 10 hours. At the end of the reaction period part of the reaction mass was withdrawn and employed as a sample, and oxypropylation was continued with the remainder of the reaction mass, as described in Example 3, following.

*Example 3a*

63.76 pounds of the reaction mass identified as Example 2a, preceding, were permitted to remain in the reaction vessel. 22.5 pounds of propylene oxide were introduced in this third stage. No additional catalyst was added. The time period was the same as in Example 2a, preceding, to wit, 8 hours. The conditions of temperature and pressure were substantially the same as in Example 1a, preceding.

At the completion of the reaction, part of the reaction mass was withdrawn and the remainder subjected to further oxypropylation, as described in Example 4a, following.

*Example 4a*

78 pounds of the reaction mass identified as Example 3a, preceding, were permitted to remain in the autoclave. Without adding any more catalyst, this reaction mass was subjected to further oxypropylation as in the preceding examples. The amount of propylene oxide added as 11.25 pounds. Conditions in regard to temperature and pressure were substantially the same as in Example 1a, preceding. At the end of the reaction period, part of the sample was withdrawn and the remainder of the reaction mass was subjected to further oxypropylation, as described in Example 5a, following.

*Example 5a*

Approximately 61.75 pounds of the reaction mass were permitted to stay in the autoclave. No additional catalyst was introduced. 17.12 pounds of propylene oxide were added in a 5- hour period. The conditions of reaction in regard to temperature and pressure were substantially the same as in Example 1a, preceding.

*Example 6a*

Approximately 70.87 pounds of the reaction mass were permitted to stay in the autoclave. No additional catalyst was introduced. 22.82 pounds of propylene oxide were added. In this particular instance the addition was very slow, due to the low concentration of catalyst. The time required was 14 hours. The conditions in regard to temperature and pressure were substantially the same as in Example 1 preceding.

In this particular series of examples, the oxypropylation was stopped at this stage. In other series I have continued the oxypropylation so that the theoretical molecular weight was approximately 9,000–10,000 and the hydroxyl molecular weight ranged from 6,000 to 7,000. Other weights, of course, are obtainable using the same procedure.

Needless to say, the procedure employed to produce oxypropylated derivatives can be employed also to produce oxyethylated derivatives and oxybutylated derivatives of the kind previously described. Such derivatives obtained by treating TMC with 1 to 10 moles of butylene oxide, or a mixture of the two, can then be subjected to oxypropylation in the same manner as illustrated by previous examples so as to yield products having the same molecular weight characteristics and the same solubility or emulsifiability in kerosene.

What is said herein is presented in tabular form in Table I, immediately following, with some added information as to molecular weight and as to solubility of the reaction product in water, xylene and kerosene.

Example 5a, one would have expected a value of approximately 4700 and the value obtained was somewhat less. The value of Example 6a seems to be perfectly normal. An oxypropylation of this kind has been repeated, and in a number of instances, in fact, in the majority of instances, the values came through perfectly normal, for instance, as shown by the following table. Figures showing only the theoretical molecular weight and the hydroxyl molecular weight would give similar oxypropylations. However, not infrequently ultimate erratic results of the above kind have been obtained in connection with TMC. No satisfactory explanation is offered. A more normal oxypropylation might show values as follows:

| Theoretical Molec. Wt. | OH Molec. Weight |
|---|---|
| 1,700 | 1,650 |
| 2,950 | 2,800 |
| 3,950 | 3,500 |
| 4,500 | 3,800 |
| 5,750 | 4,650 |
| 7,650 | 5,200 |
| 8,000 | 5,350 |

Another explanation which has sometimes appeared in the oxypropylation of nitrogen-containing compounds particularly such as acetamide, is that the molecule appears to decompose under conditions of analysis and unsaturation seems to appear simultaneously. One suggestion has been that one hydroxyl is lost by dehydration and that this ultimately causes a break in the molecule in such a way that two new hydroxyls are formed. This is shown after

TABLE I

| Ex. No. | TMC Amt., lbs. | Oxide Amt., lbs. | Catalyst, lbs. | Theo. Mol. Wt. | TMC Amt., lbs. | Oxide Amt., lbs. | Catalyst, lbs. | M. W. by hyd. Determ. in. | Max. temp., °F. | Max. Pres., lbs. sq. in. | Time, Hours |
|---|---|---|---|---|---|---|---|---|---|---|---|
| 1a | 8.62 |  | 0.82 | 1,705 | 8.62 | 58.25 | .82 | 1,740 | 205–215 | 35 | 10 |
| 2a | 7.60 | 51.37 | .72 | 2,950 | 7.6 | 94.19 | .72 | 3,110 | 205–215 | 35 | 8 |
| 3a | 4.73 | 52.58 | .45 | 3,940 | 4.73 | 80.08 | .45 | 3,430 | 205–215 | 35 | 8 |
| 4a | 4.28 | 72.31 | .41 | 4,500 | 4.28 | 83.56 | .41 | 3,810 | 205–215 | 35 | 5 |
| 5a | 3.00 | 58.47 | .28 | 5,770 | 3.00 | 75.59 | .28 | 3,710 | 205–215 | 35 | 5 |
| 6a | 2.70 | 67.92 | .25 | 7,640 | 2.70 | 90.74 | .25 | 5,200 | 205–215 | 35 | 14 |

Ordinarily in oxypropylation, the hydroxyl value molecular weight is apt to approximate the theoretical molecular weight based on completeness of reaction, if oxypropylation is conducted slowly and at a comaparatively low temperature, as described. In this instance, this was true almost up to approximately 3,000. Note, however, that a variation appears in the oxypropylation of TMC, which is exceptional. The hydroxy molecular weights were slightly higher in the case of Examples 1a and 2a than the theoretical molecular weights. One explanation which has been offered, is that one of the hydrogen atoms is liable enough to permit oxypropylation taking place by breaking the bond between a carbon atom and a hydrogen atom. This does take place perhaps in a few peculiar compounds having unusual structure, but would not be expected in this instance. Note also that in the instance of hydroxyl molecular weight of a fashion in a highly idealized manner in the following way:

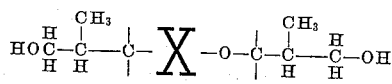

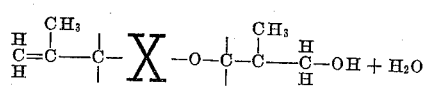

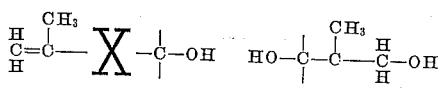

In the above formulas the large X is obviously not intended to signify anything except the central part of a large molecule, whereas, as far as a speculative explanation is concerned, one need only consider the terminal radicals, as shown. Such suggestion is of interest only because it may be a possible explanation of how an increase in hydroxyl value does take place which could be interpreted as a decrease in molecular weight. This matter is considered subsequently in the final paragraphs of the next part, i. e., Part 2.

When acidic esters were prepared from an oxypropylation showing normal values and also from an oxypropylation showing abnormal values to the extent illustrated by the above table, one could not detect any particular difference in demulsifying effect based on the same hydroxyl value molecular weight.

Referring again to Table I, Examples 1a, through 6a were water-insoluble. Examples 1a through 6a were xylene-soluble. Examples 1a and 2a were insoluble in kerosene and Example 3a showed a very definite tendency to emulsify in kerosene and subsequent Examples 4a through 6a were soluble to emulsifiable in kerosene.

The final products at the end of the oxypropylation step, were somewhat viscous liquids, more viscous than ordinary polypropylene glycols, with a slight amber tint. This color, of course, could be removed, if desired, by means of bleaching clays, filtering chars, or the like. The products were slightly alkaline, due to the residual caustic soda. The residual basicity, due to the catalyst, would be the same if sodium methylate had been employed.

Needless to say, there is no complete conversion of propylene oxide into the desired hydroxylated compounds. This is indicated by the fact that the theoretical molecular weight, based on a statistical average, is greater than the molecular weight calculated by usual methods, on basis of acetyl or hydroxyl value. This is true even in the case of a normal run of the kind noted previously. It is true also in regard to the oxypropylation of simple compounds, for instance, pentaerythritol, sorbitol, or the like, which do not show the abnormal characteristics sometimes noted in the oxypropylation of TMC.

Actually, there is no completely satisfactory method for determining molecular weights of these types of compounds with a high degree of accuracy when the molecular weights exceed 2,000. In some instances, the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out, the present invention is concerned with acidic esters obtained from the oxypropylated derivatives described in Part 1, immediately preceding, and polycarboxy acids, particularly dicarboxy acids such as adipic acid, phthalic acid, or anhydride, succinic acid, diglycollic acid, sebacic acid, azeleic acid, aconitic acid, maleic acid or anhydride, citraconic acid or anhydride, maleic acid or anhydride adducts, as obtained by the Diels-Alder reaction from products such as maleic anhydride, and cyclopentadiene. Such acids should be heat-stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy, it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader, if hydrochloric acid gas is to be used as a catalyst. Such device or absorption spreader consists of minute Alundum thimbles which are connected to a glass tube. One can add a sulfonic acid such as para-toluene sulfonic acid as a catalyst. There is some objection to this because in some instances there is some evidence that this acid catalyst tends to decompose or rearrange the oxypropylated compounds, and particularly likely to do so if the esterification temperature is too high. In the case of polycarboxy acids such as diglycollic acid, which is strongly acidic, there is no need to add any catalyst. The use of hydrochloric gas has one advantage over para-toluene sulfonic acid, and that is, that at the end of the reaction, it can be removed by flushing out with nitrogen, whereas, there is no reasonably convenient means available of removing the para-toluene sulfonic acid or other sulfonic acid employed. If hydrochloric acid is employed, one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the hydroxylated compound, as described in the final procedure just preceding Table II.

The products obtained in Part 1, preceding, may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene, decalin, petroleum solvent, or the like, so that one has obtained approximately a 65% solution. To this solution there is added a polycarboxylated reactant, as previously described, such as phthalic anhydride, succinic acid, or anhydride, diglycollic acid, etc. The mixture is refluxed until esterification is complete, as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous, straw-colored amber liquid so obtained may contain a small amount of sodium sulfate or sodium chloride, but in any event, is perfectly acceptable for esterification in the manner described.

It is to be pointed out that the products here described are not polyesters in the sense that there is a plurality of both hydroxylated compound radicals and acid radicals; the product is characterized by having only one hydroxylated In some instances, and in fact, in many instances, I have found that in spite of the dehydration methods employed above, that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the hydroxylated compound, as described in Part 1, preceding; I have added about 200 gr. of benzene, and then refluxed this mixture in the glass resin pot, using a phase-separating trap until the benzene carried out all the water present as water of solution or the equivalent. Ordinarily this refluxing temperature is apt to be in the neighborhood of 130° to possibly 150° C. When all this water or moisture has been removed, I also withdraw approximately 20 grams or a little less benzene and then add the required amount of the carboxy reactant and also about 150 grams of a high boiling aromatic petroleum solvent. These solvents are sold by various oil refineries, and, as far as solvent effect, act as if they were almost completely aromatic in character. Typical distillation data in the particular type I have employed and found very satisfactory is the following:

L. B. P., 142° C.          50 ml., 242° C.
 5 ml., 200° C.            55 ml., 244° C.
10 ml., 209° C.            60 ml., 248° C.
15 ml., 215° C.            65 ml., 252° C.
20 ml., 216° C.            70 ml., 252° C.
25 ml., 220° C.            75 ml., 260° C.
30 ml., 225° C.            80 ml., 264° C.
35 ml., 230° C.            85 ml., 270° C.
40 ml., 234° C.            90 ml., 280° C.
45 ml., 237° C.            95 ml., 307° C.

After this material is added, refluxing is continued, and, of course, is at a high temperature, to wit, about 160° to 170° C. If the carboxy reactant is an anhydride, needless to say, no water of reaction appears; if the carboxy reactant is an acid water of reaction should appear and should be eliminated at the above reaction temperature. If it is not eliminated, I simply separate out another 10 to 20 cc. of benzene by means of the phase-separating trap, and thus raise the temperature to 180° or 190° C., or even to 200° C., if need be. My preference is not to go above 200° C.

The use of such solvent is extremely satisfactory, provided one does not attempt to remove the solvent subsequently, except by vacuum distillation, and provided there is no objection to a little residue. Actually, when these materials are used for a purpose such as demulsification, the solvent might just as well be allowed to remain. If the solvent is to be removed by distillation, and particularly vacuum distillation, then the high boiling aromatic petroleum solvent might well be replaced by some more expensive solvent, such as decalin or on alkylated decalin which has a rather definite or close range boiling point. The removal of the solvent, of course, is purely a conventional procedure and requires no elaboration.

In the appended table Solvent #7-3, which appears in all instances, is a mixture of 7 volumes of the aromatic petroleum solvent previously described and 3 volumes of benzene. This was used, or a similar mixture, in the manner previously described. In a large number of similar examples decalin has been used, but it is my preference to use the above mentioned mixture, and particularly with the preliminary step of removing all the water. If one does not intend to remove the solvent, my preference is to use the petroleum solvent-benzene mixture, although obviously, any of the other mixtures, such as decalin and xylene, can be employed.

The data included in the subsequent tables, i. e., Tables II and III, are self-explanatory, and very complete, and it is believed no further elaboration is necessary.

TABLE II

| Ex. No. of acid ester | Ex. No. of oxy. cmpd. | Theo. M. W. of H. C. | Theo. hydroxyl V. of H. C. | Actual hydroxyl value | Mol. wt. based on actual H. V. | Amt. of hyd. cmpd. (grs.) | Polycarboxy reactant | Amt. of polycarboxy reactant (grs.) |
|---|---|---|---|---|---|---|---|---|
| 1b | 1a | 1,705 | 162.5 | 171 | 1,740 | 196 | Diglycollic acid | 75.5 |
| 2b | 1a | 1,705 | 162.5 | 171 | 1,740 | 196 | Phthalic anhydride | 83.3 |
| 3b | 1a | 1,705 | 162.5 | 171 | 1,740 | 199 | Maleic anhydride | 55.9 |
| 4b | 1a | 1,705 | 162.5 | 171 | 1,740 | 192 | Aconitic acid | 97.5 |
| 5b | 1a | 1,705 | 162.5 | 171 | 1,740 | 200 | Citraconic anhydride | 64.5 |
| 6b | 2a | 2,950 | 95.2 | 90 | 3,110 | 199 | Diglycollic acid | 42.9 |
| 7b | 2a | 2,950 | 95.2 | 90 | 3,110 | 199 | Phthalic anhydride | 47.4 |
| 8b | 2a | 2,950 | 95.2 | 90 | 3,110 | 202 | Maleic anhydride | 31.8 |
| 9b | 2a | 2,950 | 95.2 | 90 | 3,110 | 201 | Aconitic acid | 46.5 |
| 10b | 2a | 2,950 | 95.2 | 90 | 3,110 | 203 | Citraconic anhydride | 36.4 |
| 11b | 3a | 3,940 | 75.2 | 81.6 | 3,430 | 203 | Diglycollic acid | 33.0 |
| 12b | 3a | 3,940 | 75.2 | 81.6 | 3,430 | 199 | Phthalic anhydride | 42.9 |
| 13b | 3a | 3,940 | 75.2 | 81.6 | 3,430 | 200 | Maleic anydride | 28.6 |
| 14b | 3a | 3,940 | 75.2 | 81.6 | 3,430 | 199 | Aconitic acid | 50.5 |
| 15b | 3a | 3,940 | 75.2 | 81.6 | 3,430 | 199 | Citraconic anhydride | 32.5 |
| 16b | 4a | 4,500 | 62.3 | 75.5 | 3,810 | 200 | Diglycollic acid | 35.2 |
| 17b | 4a | 4,500 | 62.3 | 75.5 | 3,810 | 199 | Phthalic anhydride | 38.5 |
| 18b | 4a | 4,500 | 62.3 | 75.5 | 3,810 | 201 | Maleic anhydride | 25.8 |
| 19b | 4a | 4,500 | 62.3 | 75.5 | 3,810 | 194 | Aconitic acid | 44.4 |
| 20b | 4a | 4,500 | 62.3 | 75.5 | 3,810 | 195 | Citraconic anhydride | 28.0 |
| 21b | 5a | 5,770 | 48.6 | 75.5 | 3,710 | 211 | Diglycollic acid | 37.8 |
| 22b | 5a | 5,770 | 48.6 | 75.5 | 3,710 | 201 | Phthalic anhydride | 40.0 |
| 23b | 5a | 5,770 | 48.6 | 75.5 | 3,710 | 201 | Maleic anhydride | 26.4 |
| 24b | 5a | 5,770 | 48.6 | 75.5 | 3,710 | 200 | Aconitic acid | 47.0 |
| 25b | 5a | 5,770 | 48.6 | 75.5 | 3,710 | 200 | Citraconic anhydride | 30.2 |
| 26b | 6a | 7,640 | 36.8 | 53.8 | 5,200 | 205 | Diglycollic acid | 26.2 |
| 27b | 6a | 7,640 | 36.8 | 55.8 | 5,200 | 205 | Phthalic anhydride | 29.0 |
| 28b | 6a | 7,640 | 36.8 | 53.8 | 5,200 | 203 | Maleic anhydride | 19.2 |
| 29b | 6a | 7,740 | 36.8 | 53.8 | 5,200 | 203 | Aconitic acid | 34.0 |
| 30b | 6a | 7,640 | 36.8 | 53.8 | 5,200 | 203 | Citraconic anhydride | 21.8 |

TABLE III

| Ex. No. of acid ester | Solvent | Amt. solvent (grs.) | Esterification temp., °C. | Time of esterification (hrs.) | Water out (cc.) |
|---|---|---|---|---|---|
| 1b | #7-3 | 252 | 147 | 5½ | 12.2 |
| 2b | #7-3 | 279 | 161 | 7 | 1.0 |
| 3b | #7-3 | 265 | 138 | 3¾ | None |
| 4b | #7-3 | 280 | 155 | 3¾ | 10.8 |
| 5b | #7-3 | 265 | 135 | 2½ | None |
| 6b | #7-3 | 236 | 153 | 1 | 6.2 |
| 7b | #7-3 | 252 | 155 | 4½ | 0.3 |
| 8b | #7-3 | 234 | 165 | 4¼ | None |
| 9b | #7-3 | 242 | 149 | 2 | 6.6 |
| 10b | #7-3 | 238 | 137 | 3 | None |
| 11b | #7-3 | 241 | 143 | 3 | 4.7 |
| 12b | #7-3 | 242 | 140 | 4½ | None |
| 13b | #7-3 | 229 | 145 | 4 | None |
| 14b | #7-3 | 245 | 178 | 3½ | 5.4 |
| 15b | #7-3 | 232 | 149 | 2 | None |
| 16b | #7-3 | 230 | 174 | 2 | 4.8 |
| 17b | #7-3 | 238 | 143 | 4½ | None |
| 18b | #7-3 | 233 | 134 | 5 | 4.3 |
| 19b | #7-3 | 234 | 178 | 4¾ | None |
| 20b | #7-3 | 223 | 134 | 2 | 5.6 |
| 21b | #7-3 | 244 | 166 | 3 | None |
| 22b | #7-3 | 241 | 138 | 5¾ | None |
| 23b | #7-3 | 227 | 136 | 5¼ | 4.9 |
| 24b | #7-3 | 242 | 176 | 2¾ | None |
| 25b | #7-3 | 230 | 152 | 2¼ | 3.8 |
| 26b | #7-3 | 231 | 158 | 3½ | None |
| 27b | #7-3 | 233 | 136 | 2 | None |
| 28b | #7-3 | 220 | 136 | 5⅓ | 3.1 |
| 29b | #7-3 | 239 | 190 | 7 | None |
| 30b | #7.3 | 230 | 162 | 3 | |

The procedure for manufacturing the esters has been illustrated by preceding examples. If, for any reason, reaction does not take place in a manner that is acceptable, attention should be directed to the following details:

(a) Recheck the hydroxyl or acetyl value of the oxypropylated primary amines of the kind specified, and use a stoichiometrically equivalent amount of acid;

(b) If the reaction does not proceed with reasonable speed, either raise the temperature indicated or else extend the period of the time up to 12 or 16 hours, if need be;

(c) If necessary, use ½% of paratoluene sulfonic acid, or some other acid as a catalyst; and (d) If the esterification does not produce a clear product, a check should be made to see if an inorganic salt such as sodium chloride or sodium sulfate is not precipitating out. Such salt should be eliminated, at least for exploration experimentation, and can be removed by filtering.

Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction, there are formed certain compounds whose compositions are still obscure. Such side reaction products can contribute a substantial proportion of the final cogeneric reaction mixture. Various suggestions have been made as to the nature of these compunds, such as being cyclic polymers of propylene oxide, dehydration products with the appearance of a vinyl radical, or isomers of propylene oxide or derivatives thereof, i. e., of an aldehyde, ketone, or allyl alcohol. In some instances, an attempt to react the stoichiometric amount of a polycarboxy acid with the oxypropylated derivative results in an excess of the carboxylated reactant, for the reason that apparently under conditions of reaction less reactive hydroxyl radicals are present than indicated by the hyroxyl value. Under such circumstances, there is simply a residue of the carboxylic reactant which can be removed by filtration, or, if desired, the esterification procedure can be repeated, using an appropriately reduced ratio of carboxylic reactant.

Even the determination of the hydroxyl value and conventional procedure leaves much to be desired, due either to the cogeneric materials previously referred to, or, for that matter, the presence of any inorganic salts or propylene oxide. Obviously, this oxide should be eliminated.

The solvent employed, if any, can be removed from the finished ester by distillation, and particularly vacuum distillation. The final products or liquids are generally from almost water white or pale straw to a light amber in color, and show moderate viscosity. They can be bleached with bleaching clays, filtering chars, and the like. However, for the purpose of demulsification or the like, color is not a factor and decolorization is not justified.

In the above instances I have permitted the solvents to remain present in the final reaction mass. In other instances, I have followed the same procedure using decalin or a mixture of decalin or benzene in the same manner and ultimately removed all the solvents by vacuum distillation.

PART 3

One need not point out the products obtained as intermediates, i. e., the oxypropylation products, can be subjected to a number of other reactions which change the terminal groups, as, for example, reaction of ethylene oxide, butylene oxide, glycide, epichlorohydrin, etc. Such products still having residual hydroxyl radicals can again be esterified with the same polycarboxy acids described in Part 2 to yield acidic esters, which, in turn, are suitable as demulsifying agents.

Furthermore, such hydroxylated compounds obtained from the polyoxypropylated materials described in Part 2, or, for that matter, the very same oxypropylated compounds described in Part 2 without further reaction, can be treated with a number of reactive materials, such as dimethyl sulfate, sulfuric acid, ethylene imine, etc., to yield entirely new compounds. If treated with maleic anhydride, monochloroacetic acid, epichlorohydrin, etc., one can prepare further obvious variants by (a) reacting the maleic acid ester after esterification of the residual carboxyl radical with sodium bisulfite so as to give a sulfosuccinate. Furthermore, derivatives having a labile chlorine atom such as those obtained from chloroacetic acid or epichlorohydrin, can be reacted with a tertiary amine to give quaternary ammonium compounds. The acidic esters described herein can, of course, be neutralized with various compounds, so as to alter the water and oil solubility factors, as, for example, by the use of trietha olamine, cyclohexylamine, etc. All these variations and derivatives have utility in various arts where surface-active materials are of value and particularly are effective as demulsifiers in the resolution of petroleum emulsions, as described in Part 3. They may be employed also as break-inducers in the doctor treatment of sour crude, etc.

Having thus described my invention what I claim as new and desire to secure by Letters Patent is:

1. Hydrophile synthetic products which are acidic fractional esters of the formula $$[R'O_5(R'''O)_{n''}][(RO)_n\overset{O}{\underset{\|}{C}}R''(COOH)_{n'}]_5$$

in which the acidic acyl radical is that of a polycarboxy acid selected from the group consisting of acyclic and isocyclic polycarboxy acids having not more than 8 carbon atoms and composed of carbon, hydrogen and oxygen of the formula

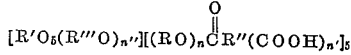

in which $n'$ is a whole number not greater than 2; and in which the alcohol radical is that of the pentahydroxylated compound $$[R'O_5(R'''O)_{n''}][(RO)_nH]_5$$

in which R'(OH)5 represents tetramethylolcyclohexanol, R''' is a radical selected from the class consisting of ethylene and butylene radicals, $n''$ is an integer not greater than 10, including zero, (RO) is the divalent propylene oxide radical and $n$ is a number so selected that the molecular weight of $$[R'O_5(R'''O)_{n''}][(RO)_nH]_5$$

is within the range of 1500 to 6000.

2. Hydrophile synthetic products which are acidic fractional esters of the formula $$[R'O_5(R'''O)_{n''}][(OR)_n\overset{O}{\underset{\|}{C}}R''COOH]_5$$

in which the acidic acyl radical is that of a dicarboxy acid selected from the group consisting of acyclic and isocyclic dicarboxy acids having not more than 8 carbon atoms and composed of carbon, hydrogen and oxygen of the formula $$R''(COOH)_2$$

and in which the alcohol radical is that of the pentahydroxylated compound $$[R'O_5(R'''O)_{n''}][(RO)_nH]_5$$

in which R'(OH)5 represents tetramethylolcyclohexanol, R''' is a radical selected from the class consisting of ethylene and butylene radicals, $n''$ is an integer not greater than 10, including zero, (RO) is the divalent propylene oxide radical and $n$ is a number so selected that the molecular weight of $[R'O_5(R'''O)_{n''}][(RO)_nH]_5$ is within the range of 1500 to 6000.

3. Hydrophile synthetic products being an acidic fractional ester of the following formula:

$$R'\left[O(RO)_n\overset{O}{\underset{\|}{C}}R''(COOH)_{n'}\right]_5$$

in which the acidic acyl radical is that of a polycarboxy acid selected from the group consisting of acyclic and isocyclic polycarboxy acids having not more than 8 carbon atoms and composed of carbon, hydrogen and oxygen of the formula:

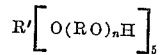

in which R'' is the radical of the polycarboxy acid and $n'$ is a whole number not greater than 2; and the alcohol is that of the pentahydroxylated compound $$R'\left[O(RO)_nH\right]_5$$

in which R'(OH)5 represents tetramethylolcyclohexanol and (RO) is the divalent propylene oxide radical and $n$ is a number so selected that the molecular weight of $$R'\left[O(RO)_nH\right]_5$$

is within the range of 1500 to 6000.

4. Hydrophile synthetic products being an acidic fractional ester of the following formula:

$$R'\left[O(RO)_n\overset{O}{\underset{\|}{C}}R''COOH\right]_5$$

in which the acidic acyl radical is that of a dicarboxy acid selected from the group consisting of acyclic and isocyclic dicarboxy acids having not more than 8 carbon atoms and composed of carbon, hydrogen and oxygen of the formula:

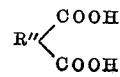

in which R'' is the radical of the dicarboxy acid; and the alcohol radical is that of the pentahydroxylated compound:

$$R'\left[O(RO)_nH\right]_5$$

in which R'(OH)₅ represents tetramethylolcyclohexanol and (RO) is the divalent propylene oxide radical and $n$ is a number so selected that the molecular weight of $$R'\left[O(RO)_nH\right]_5$$

is within the range of 1500 to 6000.

5. The product of claim 4, wherein the dicarboxy acid is phthalic acid.
6. The product of claim 4, wherein the dicarboxy acid is maleic acid.
7. The product of claim 4, wherein the dicarboxy acid is succinic acid.
8. The product of claim 4, wherein the dicarboxy acid is citraconic acid.
9. The product of claim 4, wherein the dicarboxy acid is diglycollic acid.

MELVIN DE GROOTE.

No references cited.